2,998,407
POLYMERIC COMPOSITIONS

Walter E. Foster and Paul E. Koenig, Baton Rouge, La., assignors to Ethyl Corporation, New York, N.Y., a corporation of Delaware
No Drawing. Filed Dec. 17, 1956, Ser. No. 628,475
9 Claims. (Cl. 260—46.5)

This invention relates to organic polymers containing tin and other metallic elements in the chain-building units.

Under normal conditions of use, conventional organic polymers, wherein carbon atoms are the principal repeating units, are sufficiently stable for most applications. Recently, polymers containing silicon atoms have been developed which have the advantage of stability under conditions of use more drastic than those for which the organic polymers are intended. However, conditions of use for materials are presently contemplated for which no known compositions are suitable. In particular, stability at high temperature and over wide temperature ranges, high impact resistance, high dielectric strength and exposure to vigorous chemical attack are increasingly being required in both liquid and solid materials employed in numerous articles for commercial or military applications. As a typical example of the rigorous conditions imposed on materials are those created during operation of high performance aircraft where not only are the engine components but also the materials of construction and exposed surfaces subjected to extremes of conditions heretofore not encountered.

It is therefore an object of this invention to provide a class of materials susceptible to use in liquid or resinous form having a multitude of uses and highly stable to thermal, electrical, physical and chemical exposure. It is a further object of this invention to provide materials combining the advantageous properties of organic compounds with the stability characteristic of inorganic compounds. It is likewise an object of this invention to provide processes of manufacturing such materials and methods of formulation and use.

The above and other objects are accomplished by providing organic polymers characterized by containing structural units containing tin bonded through linking atoms selected from the group consisting of chalkogen and nitrogen to metallic atoms other than tin capable of forming polyhydroxides which produce protons in the presence of strong bases.

For purposes of describing the polymers of this invention the following characterization represents one form of such materials.

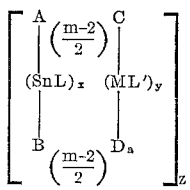

In the above illustrative characterization A, B, C and D comprise organic radicals, chalkogen or other polymeric units, but at least one of A, B, C and D is organic; M is a metallic element other than tin, that is, a metal or a metalloid, capable of producing a polyhydroxide which in the presence of a sufficiently strong base dissociates to form a proton; L is a chalkogen, that is, oxygen or sulfur, or is trivalent nitrogen; $m$ is the valence of tin, that is, 2 or 4; ($a$) is zero when the valence of the metallic element M is 3 and is 1 when the valence of the metallic element M is 4 or 5; and $x$, $y$ and $z$ are integers.

Among the metallic atoms M, other than tin, forming the polymers of this invention and which are capable of forming polyhydroxides producing protons in the presence of strong bases, the heavy metals, that is, the metals of groups III-A, III-B, IV-A, IV-B, V-A, V-B, VI-A, VI-B, and VII-B, as well as the metalloids boron, silicon, phosphorous, arsenic and tellurium are employed.

The foregoing definition of the heavy metals and metalloids is in accordance with the periodic chart of the elements produced in "Introductory College Chemistry" by H. G. Deming, John Wylie and Sons, Inc.

The polymers of this invention are either linear polymers or cross-linked polymers. Cross-linking can occur through the linking atom when such atom is nitrogen. Thus while the general class of polymers of this invention share in general the properties of high stability to thermal, physical, chemical or electrical forces, the physical properties of such polymers are markedly changed when employing chalkogen or unsubstituted nitrogen linking atoms. Furthermore, cross-linking in the polymers can occur through the tin atom or through the metallic atom other than tin. When such occurs, as in the graphic representation above, one or more of A, B, C or D can represent other polymer units.

In one embodiment of the polymers of this invention the subscripts $x$ and $y$ are 1. In such instances the tin and metallic element M occur in repeating sequence. However, when the integers $x$ or $y$ are greater than 1 the polymers of this invention can contain units wherein either the tin containing group or metallic element M containing group occurs as a repeating unit as visualized above. In general, it is preferred that the integers $x$ and $y$ are between 1 and about 200. The molecular weight of the polymers of this invention can vary widely and thus produce a variety of useful materials. In general the integer $z$ can vary from 2 to about 2000 providing a range of products varying from labile liquids to hard resinous masses.

When the substituents A, B, C and D are organic they can be hydrocarbon or substituted hydrocarbon groups. In general both acyclic and cyclic organic substituents can be employed. Among the acyclic substituents aliphatic hydrocarbons having 1 to about 18 carbon atoms are preferred although for some purposes such hydrocarbon radicals can contain inert substituents such as the halogens. When the organic substituents are cyclic radicals they can be carbocyclic or heterocyclic. Among the heterocyclic radicals it is preferred to employ oxygen, nitrogen or sulfur as the hetero atom. Furthermore, the carbocyclic substituents can be aliphatic or aromatic. In the heterocyclic embodiment certain unsaturated heterocyclic radicals can be employed and provide highly stable materials. In general it is preferred to employ cyclic radicals having between about 4 and 14 carbon atoms in the nucleus. It is to be understood that the organic radicals above can be attached to the tin or metallic elements other than tin or the nitrogen linking atoms either directly or through a chalkogen, that is, oxygen or sulfur. The properties of the resulting polymers are modified thereby. In some instances, the polymers obtained wherein such organic substituents are linked through chalkogens exhibit extremely high thermal stability.

When the linking atom L or L' employed in the composition of this invention is nitrogen and it is desired to obtain polymers not cross-linked at this point in the molecule, the nitrogen atom is substituted with an organic radical. In general, aliphatic or aromatic hydrocarbon radicals are employed for this purpose having 1 to 18 carbon atoms. However, for some purposes heterocyclic radicals having 4 to 6 carbon atoms in the nucleus can be employed.

The polymers of this invention can vary in physical properties from labile liquids to resinous solids. The variation of properties is not so much dependent upon the molecular weight of the polymer but rather upon the structural configuration and choice of the various ingredients in the polymer units. Thus, the polymers of this invention can comprise low molecular weight cyclic polymers and in general these are either crystalline solids or liquids. An example of such a cyclic embodiment of the polymers of this invention is the illustrative representation:

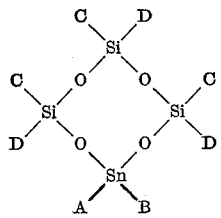

Upon further polymerization, or co-polymerization with other organic polymers of this invention these materials become viscous and, if the treatment is continued to a high degree of polymerization, are rendered solid. Many of the liquid polymers of this invention exhibit low volatility coupled with high thermal stability. Therefore, such materials find wide application as damping fluids, hydraulic fluids, heat transfer media and lubricant additives. Among the more viscous polymers of this invention, many exhibit high lubricity and can be employed as such as or as lubricant additives. Among the solid polymers of this invention many are thermoplastic and, therefore, can be fabricated by extrusion, injection molding and other conventional means. For the preparation of surface coatings having a high degree of stability under conditions of use, the solid polymers of this invention can be dissolved in appropriate solvents, applied to a surface and upon evaporation of the solvent form an adherent permanent coating. In all forms the polymers of this invention are susceptible to pigmentation or dyeing to render the otherwise clear and translucent materials opaque to visible radiation.

It is not intended from the foregoing discussion to limit the polymers of this invention to tin linked through chalkogen or nitrogen to a single metallic element of the defined class. By appropriate process techniques the metallic elements in the polymers of this invention can comprise a plurality of such elements. This can be achieved by intercondensing the tin-containing reactant with a plurality of metallic compounds or by producing low molecular weight polymers, of the class defined herein, containing active end groupings, and further condensing such substrates with similar substrates containing other metals.

In general the polymers of this invention exhibit limited solubility in hydrocarbon solvents and in general somewhat greater solubility in solvents of the coordinating type. Particularly useful among this latter class are the higher ethers, cyclic ethers and polyethers such as dioxane and the polyethers of polyhydric alcohols.

The physical properties of the compositions of this invention are additionally dependent upon the tin:metal ratio. For example, in the case of a stannosiloxane polymer, when approximately a 1:1 mole ratio of the tin:silicon compounds are employed in the process of this invention, the product is a hard, transparent, glass and relatively insoluble. However, when an excess of the silicon compound is employed, the polymeric substance is a liquid or a semi-solid. For example, when 216 parts of diphenylsilanediol are reacted with 288 parts of diphenyltin oxide, the insoluble, hard, transparent glasslike polymeric substance obtained contains one atom of tin for each atom of silicon. Likewise, when 2160 parts of diphenylsilanediol and 288 parts of diphenyltin oxide are reacted, a liquid, easily soluble polymer substance is obtained containing 10 atoms of silicon for each atom of tin.

One method for manufacturing the polymers of this invention comprises reacting an organotin oxide with an organo metallic dihydroxide of the appropriate metal as defined hereinabove. In the example which follows, one such process is illustrated wherein the polymer containing tin and silicon linked through oxygen was prepared. In this and the other examples which follow, unless specified otherwise, all parts and percentages are by weight.

*Example I*

To a reaction vessel provided with means for heating and refluxing was added a mixture of 216 parts of diphenylsilanediol and 288 parts of diphenyltin oxide. After the addition of these reactants, dioxane, 60 percent by weight, was added. Heat was then applied and the reaction mixture refluxed at the atmospheric boiling point for a period of six hours, during which time the insoluble diphenyltin oxide gradually became dissolved in the dioxane solvent. After the reaction was complete, as indicated by the substantial disappearance of turbidity of the reaction mixture, the mixture was allowed to cool sufficiently for handling and then filtered through a layer of diatomaceous earth. The filtrate containing the product was then distilled at atmospheric pressure so as to remove the greater majority of the dioxane solvent. The last traces of the solvent were then removed by distillation at a pressure of 1 mm. of mercury. The polymeric material having the repeating structure

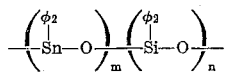

was obtained as a brittle, transparent glass in a 90 percent yield based on the starting materials.

In the foregoing example when the proportions of diphenylsilanediol and diphenyltin oxide are varied so that an increasing amount of diphenylsilanediol is employed, the product varies from the brittle polymer to a waxy material and to a viscous oil as the amount of diphenylsilanediol compound increases.

In addition to the tin-oxygen-silicon polymer produced in the foregoing example, when the corresponding diols of titanium, vanadium, molybdenum, manganese, aluminum, boron and arsenic are employed in combination with equal molar parts of diphenyltin oxide, similar transparent, solid polymers are produced having high thermal stability and good dielectric properties. Similarly, when the diethyl metallo dihydroxide of the foregoing metals are reacted with 4 molar equivalents of dibutyltin oxide, clear, slightly viscous oils are obtained suitable for use as hydraulic fluids having low volatility and a wide liquid temperature range. These materials have low toxicity and can be employed in sensitive hydraulic systems without producing corrosion of moving parts.

Another process for producing the polymers of this invention particularly applicable where the dihydroxides are difficultly obtainable compounds comprises reacting the appropriate diorgano metallo dihalide with a diorganotin dialkoxide. In this process alkyl halides are co-produced and with the higher alkyls provide a convenient reaction medium for solubilizing the product. For economic processes it is usually desirable to recover such alkyl halide by-products for recycle.

*Example II*

In a reaction vessel provided with means for heating and refluxing is placed a mixture of 334 parts of diphenyltin dimethoxide, 253 parts of diphenyldichlorosilane, and 1000 parts of diethyleneglycol dimethyl ether. The reaction mixture is heated to reflux; methyl chloride is liberated and may be condensed in a cold trap surrounded by solid carbon dioxide and acetone. After about 36 hours liberation of methyl chloride is complete. The reaction mixture is distilled to remove the solvent. Monomeric contaminants are removed from the polymeric residue by extraction with petroleum ether. The viscous liquid polymeric product $(\phi_2Sn\text{—}O)_x(Si\phi_2\text{—}O)_y$ is obtained in satisfactory yields having a molecular weight in the range of 500.

Similarly when the tin reactant is dimethyltin dimethoxide, dibutyltin dimethoxide, dicyclohexyltin dimethoxide or methyl phenyltin dimethoxide, the co-polymer with the diphenyl dichlorosilane is a viscous liquid or a resinous solid as the proportions of tin to silicon compound are varied between the limits of 1:1 to 1:10. All such polymers however have high thermal stability and good dielectric properties. Further, in accordance with the process of Example II, methyl aluminum sesquichloride, diethyl germanium dibromide, ethyl boron trichloride, and ethyl bismuth diiodide can be condensed in the atom ratio of 1:1 with diphenyltin dimethoxide to produce clear, resinous polymers.

Another process for producing the co-polymers of this invention related to the foregoing process typified by Example II comprises reacting an organo metallo dihydroxide wherein the metallic element is as defined hereinabove with a diorganotin dichloride in the presence of an alkali metal. A preferred embodiment of this process, the organo metallic diol, is first reacted with sodium metal in an ether solvent to form the sodium derivative thereof and subsequently react this mixture with the diorganotin dihalide in appropriate proportions to provide polymers having the desired properties.

*Example III*

To a reaction vessel provided with means for agitation, continuous addition of reactants, heating, and refluxing was added 216 parts of diphenylsilanediol and 1250 parts of dioxane. To this mixture was added 46 parts of massive sodium over a period of one hour with vigorous agitation. Upon completion of this addition, during which time the temperature of the reaction mixture gradually raised to reflux temperature, refluxing was continued for a period of several hours until consumption of the sodium was complete. Thereupon was added 343 parts of diphenyltin dichloride dissolved in 2000 parts of dioxane over a period of one-half hour with vigorous agitation. The reaction mixture was then refluxed at atmospheric pressure for a period of one hour. Upon completion of the reflux period the mixture was filtered through a layer of diatomaceous earth so as to remove precipitated sodium chloride and other solids, followed by distillation at atmospheric pressure of the filtrate containing the reaction product so as to remove the solvent. In order to remove the last traces of solvent it was necessary to heat the reaction mixture under a pressure of 1 mm. of mercury. The waxy polymeric product having the structure

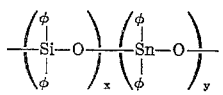

was obtained in a 30 percent yield.

The following example illustrates a different process useful in manufacturing the polymers of this invention wherein the organo metallic dihydroxide and the organotin halide are condensed in the proper proportions in the presence of a strong base. Among such strong bases are preferred the alkali hydroxides.

*Example IV*

To a reaction flask provided with means for heating, refluxing, continuous addition of reactants and agitation, and containing a mixture of 219 parts of dimethyltin dichloride and 364 parts of p-phenoxyphenyl-p-t-butylphenylsilanediol and 1000 parts of chloroform is added 80 parts of sodium hydroxide as a 4 percent aqueous solution over a period of one-half hour while vigorously stirring the reaction mixture. Upon completion of the addition, the mixture is refluxed at atmospheric pressure for a period of one hour. The mixture is then filtered through a layer of diatomaceous earth and the aqueous layer separated and discarded. Thereafter the chloroform is separated from the product by distillation at atmospheric pressure. The viscous "syrupy" polymeric substance having the structure

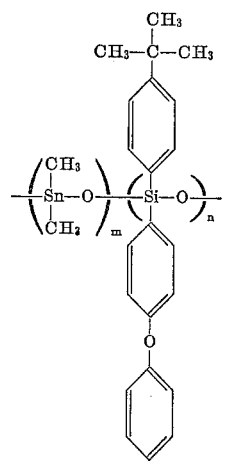

is obtained in good yield.

In addition to the organo metallo hydroxides in the foregoing example where these are difficultly obtained the corresponding metallo organo halides can be condensed with the organotin dihalide in the presence of a strong base as shown in the following example.

*Example V*

The process of Example IV is followed utilizing a mixture of 359 parts of isopropyl-2-naphthyltin dichloride, 253 parts of diphenyldichlorosilane, and 1000 parts of dioxane. The waxy polymeric substance having the structure

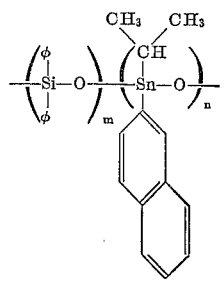

is obtained in satisfactory yields.

In a further modification of the foregoing example, phenyltrichlorosilane is reacted with diphenyltin dichloride in the presence of sodium hydroxide, thereby producing a cross-linked polymer having high impact and tensile strength suitable for the fabrication of products requiring rigidity and resistance to thermal shock and chemical attack.

A process which is particularly useful in polymers comprising tin and the metalloid elements is one in which the appropriate organo metalloid acid is condensed with an organotin oxide in proper proportions to provide polymers having the desired properties.

*Example VI*

In this case the process of Example I is followed utilizing a mixture of 96 parts of methane phosphonic acid and 164 parts of dimethyltin oxide and additionally employing 500 parts of dioxane. Furthermore, this mixture is heated for 8 hours at reflux temperature at atmospheric pressure. The product having the structure

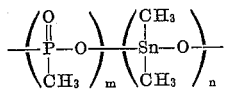

is obtained in good yield.

Similar polymers are produced by so condensing methane arsonic acid, methane boronic acid, methane bismuth diol and the like with dimethyltin oxide.

*Example VII*

This process employs a mixture of 343 parts of diphenyltin dichloride, 104 parts methylaluminum dimethoxide and 500 parts dioxane, following the process of Example II. Additionally, this case varies from Example II in that a reflux period of 24 hours at atmospheric pressure is employed. However, this process results in more than satisfactory yields of the white amorphous polymeric substance having the structure

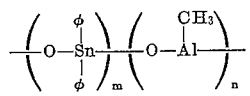

While the foregoing processes are applicable to the manufacture of the co-polymers of this invention wherein sulfur comprises a linking atom by employing the sulfur analogs of the materials illustrated above, it is usually more convenient to prepare such sulfur analogs in situ. Thus, in general such polymers can be prepared by reacting the polyfunctional organo metallic reactant with hydrogen sulfide in the reaction vessel prior to condensation with the polyfunctional organotin reactant. In a preferred embodiment of this process diorgano metallic dihalides are reacted with hydrogen sulfide and then condensed with a diorganotin dihalide. This process is further illustrated in the following example.

*Example VIII*

Following the process of Example III, however in this case employing as reactants 343 parts of diphenyltin dichloride and 253 parts of diphenylsilane dithiol (prepared in situ by passing hydrogen sulfide through a dioxane solution of diphenyldichlorosilane), and utilizing as a solvent a total of 1500 parts of dioxane, satisfactory yields of the semi solid polymeric product having the structure

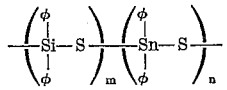

are obtained when the reaction mixture is refluxed at atmospheric pressure for one hour.

Preparation of the polymers of this invention wherein the repeating units contain nitrogen is illustrated in the following example wherein the organo metallic amide is reacted with an organotin compound of appropriate reactivity. Thus, in general organotin halides and organotin amides are caused to react in the presence of a condensing agent with the organo metallic amide in monomeric or homo polymeric form. Such organo metallic amides of metals other than tin, as hereinabove defined, can in turn be prepared in situ by reaction of the corresponding halide with ammonia. The resulting polymers are frequently cross-linked through such unsubstituted nitrogen atom to provide materials of high rigidity. If, in place of ammonia in the foregoing reaction, primary amines are employed the resulting polymer from the reaction of the organo metallic N-amide is largely linear, providing flexible or liquid polymers.

*Example IX*

To a reaction flask provided with means for heating and refluxing are added 73 parts of octamethylcyclotetrasilazane, 163 parts of dimethyltin amide and 500 parts of dioxane. The reaction mixture is refluxed at the atmospheric boiling point for a period of 8 hours in the presence of a trace of solid potassium hydroxide. Upon completion of the heating period the reaction mixture is filtered through a layer of diatomaceous earth and the filtrate containing the product is distilled under atmospheric pressure so as to remove the dioxane solvent. The remaining mixture is then subjected to further distillation at a pressure of 1 mm. of mercury removing the last traces of solvent and leaving as a residue the transparent, resinous polymeric product having the structure

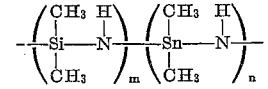

in substantial yields.

*Example X*

To a reaction flask provided with means for heating and arranged for evacuation to 0.5 mm. of mercury pressure, is added 216 parts of diphenylsilanediol and 164 parts of dimethyltin oxide, which have been thoroughly mixed by grinding in a mortar. The powdery reactants are heated to a temperature of 200° C., at which temperature the powdery substances are completely converted to a liquid which effervesces as water is lost from the reactants. Heating is continued at this temperature for one hour. The transparent, glassy polymeric substance having the structure

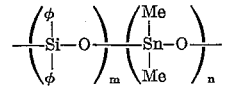

is obtained in satisfactory yields.

*Example XI*

The process of Example IV is followed in this case utilizing a mixture of 244 parts of dimethoxydiphenylsilane, 284 parts of dibutyltin dimethoxide and 2,000 parts of chloroform, and additionally adding 160 parts of sodium hydroxide as a 4 percent aqueous solution. The brittle transparent polymeric substance having the repeating structure.

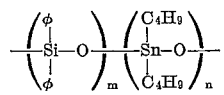

is obtained in satisfactory yields.

*Example XII*

In this example the process of Example IV is followed with the exceptions that 214 parts of diaminodiphenylsilane, 334 parts of diphenyltindimethoxide, 1500 parts of chloroform, and furthermore 224 parts of potassium hydroxide as a 4 percent solution are used to obtain the hard, glassy polymeric substance having the repeating structure

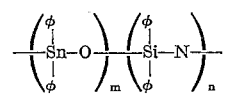

in substantial yields.

*Example XIII*

A reaction vessel is equipped with means for heating and refluxing. To the vessel is added a mixture of 274 parts of diphenylstannane, 216 parts of diphenylsilanedoil and 1000 parts of benzene. The reaction mixture is then refluxed at atmospheric boiling point for a period of one hour. Upon completion of the heating period of the reaction mixture is filtered and the aqueous portion of the filtrate discarded. The benzene solvent is then distilled from the reaction mixture at a pressure of .1 mm. of mercury and the hard, transparent polymeric substance having the repeating structure

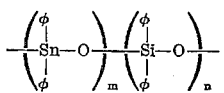

is obtained in satisfactory yields.

*Example XIV*

The process of Example I is followed, in this case utilizing 202 parts of phenylarsonic acid, 164 parts of dimethyltin oxide and 500 parts of dioxane so as to obtain the solid, amorphous polymeric substance having the structure

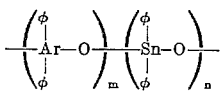

In the process of this invention the proportions of reactants employed can be varied within wide limits. However, the properties of the product produced are dependent upon the particular proportions employed. In general, either reactant can be present in major proportions and it is preferred that the ratio of reactants remain within the limits of 1 to 200:1. The purity of the reactants is important as, to a great degree, the ultimate size of the polymer produced is dependent upon this factor.

In producing the product of this invention by the various processes described hereinabove, a wide temperature range can be employed. In general, temperatures varying between about 0 and 400° C. can be employed and within this range it is preferred to operate between about 80 and 200° C. The upper temperature limit is dependent upon the stability of the reactants while the lower temperature limit is chosen so as to provide a reaction proceeding at a reasonable rate and designed to minimize undesirable side reactions.

The catalyst employed in the process of this invention can be strong acids such as sulfuric acid, hydrochloric acid, nitric acid and the like. Additionally, the catalyst utilized can be stronge bases, such as sodium hydroxide, potassium hydroxide and the like. Furthermore, in some embodiments of this invention, specifically, in those instances where a condensation is effected between an alkoxy metal compound and a tin halide, it is desirable to employ as a catalyst certain Lewis acids such as boron trichloride, aluminum trichloride and the like.

The process can be conducted either in a batch or continuous manner. In batch operations the total reaction time can be one-half hour to 48 hours, however, a half hour to 8 hours is preferred. When carried out continuously it is preferred to employ a tube-type reactor. In the latter case the mixture of metal compounds and tin compounds and additionally any solvents or catalysts can be fed continuously in the desired proportions to the inlet end of the tube-type reactor.

We claim:

1. The product obtained by reacting, at reflux temperature in an inert solvent, (1) a monovalent dihydrocarbon substituted silane, wherein the hydrocarbon group is bonded to the silicon of the silane by carbon to silicon bonding, and the remaining valences of the silane are directly connected to groups from the class consisting of hydroxyl halogen, alkoxy, alkali metallooxy and amine with (2) a tetravalent tin compound, wherein at least two of the valences of the tin are connected directly to functional groups selected from the class consisting of oxide, hydroxyl, alkoxy, halogen and amine, and the remaining valences of the tin are bonded to at least one monovalent hydrocarbon group by carbon to tin bonding, the reaction being carried out under conditions capable of causing the silane alone to condense to a material selected from the group consisting of siloxanes and silazanes.

2. The product of claim 1 wherein said silane is an aromatic hydrocarbon silane diol.

3. The product of claim 1 wherein said tin compound is a hydrocarbon tin oxide.

4. The product of claim 1 wherein said silane is an aromatic dihydrocarbon silane diol and said tin compound is a dihydrocarbon tin oxide.

5. The product obtained by reacting, at reflux temperature in an inert solvent, diphenyl silane diol with diphenyl tin oxide.

6. The product obtained by reacting, at reflux temperature in an inert solvent, diphenyl dichlorosilane with diphenyl tin dimethoxide.

7. The product obtained by reacting, at reflux temperature in an inert solvent, dimethoxy diphenyl silane with dibutyl tin dimethoxide, the reaction being conducted in contact with aqueous sodium hydroxide.

8. The product obtained by reacting at reflux temperature in an inert solvent containing a strong aqueous base (1) a dihydrocarbon silane dihalide wherein the hydrocarbon groups are each monovalent and bonded to the silicon of the silane by carbon-to-silicon bonding, with (2) a dihydrocarbon tin dihalide wherein the hydrocarbon groups are each monovalent and bonded to the tin by carbon-to-tin bonding.

9. The product obtained by reacting at reflux temperature in an inert solvent (1) a dialkali metal salt of a dihydrocarbon silane diol wherein the hydrocarbon groups are each monovalent and bonded to the silicon of the silane diol by carbon-to-silicon bonding with (2) a dihydrocarbon tin dihalide wherein the hydrocarbon groups are each monovalent and bonded to the tin by carbon-to-tin bonding.

References Cited in the file of this patent

UNITED STATES PATENTS

| | | |
|---|---|---|
| 2,413,184 | La Lande | Dec. 24, 1946 |
| 2,713,585 | Best | July 19, 1955 |
| 2,762,821 | Walde et al. | Sept. 11, 1956 |
| 2,814,601 | Currie et al. | Nov. 26, 1957 |
| 2,818,906 | Bradley | Jan. 7, 1958 |
| 2,843,555 | Berridge | July 15, 1958 |

OTHER REFERENCES

"Dana's Textbook of Mineralogy," J. W. Wiley & Sons, Inc. N.Y. (1932), p. 633.